United States Patent
Nandam et al.

(10) Patent No.: US 9,748,799 B2
(45) Date of Patent: Aug. 29, 2017

(54) ADAPTABLE EXTERNAL BATTERY MODULES AND RELATED SYSTEMS

(71) Applicant: Eaton Corporation, Cleveland, OH (US)

(72) Inventors: Pradeep Kumar Nandam, Cary, NC (US); David Glenn Miller, Clayton, NC (US)

(73) Assignee: Eaton Corporation, Cleveland, OH (US)

( * ) Notice: Subject to any disclaimer, the term of this patent is extended or adjusted under 35 U.S.C. 154(b) by 273 days.

(21) Appl. No.: 14/620,393

(22) Filed: Feb. 12, 2015

(65) Prior Publication Data

US 2016/0241081 A1 Aug. 18, 2016

(51) Int. Cl.
*H02J 9/06* (2006.01)
*H02J 7/00* (2006.01)
*H01M 10/42* (2006.01)

(52) U.S. Cl.
CPC ............ *H02J 9/061* (2013.01); *H02J 7/0068* (2013.01); *H02J 7/0077* (2013.01); *H02J 9/06* (2013.01); *H01M 2010/4271* (2013.01); *H01M 2220/10* (2013.01)

(58) Field of Classification Search
CPC .................. H02J 9/061; H02J 7/0077; H01M 2010/4271; H01M 2020/10
USPC .......................................................... 307/66
See application file for complete search history.

(56) References Cited

U.S. PATENT DOCUMENTS

| | | | |
|---|---|---|---|
| 6,201,319 B1 | 3/2001 | Simonelli et al. | |
| 6,424,119 B1 | 7/2002 | Nelson et al. | |
| 7,872,374 B2 | 1/2011 | Gottlieb et al. | |
| 8,952,566 B2 * | 2/2015 | Harris | G06F 1/183 307/66 |
| 2005/0043859 A1 | 2/2005 | Tsai et al. | |
| 2005/0162019 A1 | 7/2005 | Masciarelli et al. | |
| 2005/0162129 A1 | 7/2005 | Mutabdzija et al. | |
| 2007/0217128 A1 | 9/2007 | Johnson, Jr. | |
| 2010/0019735 A1 | 1/2010 | Hori et al. | |
| 2012/0098343 A1 | 4/2012 | Harris et al. | |

OTHER PUBLICATIONS

Notification of Transmittal of the International Search Report and the Written Opinion of the International Searching Authority, or the Declaration, PCT/US2016/017440, May 24, 2016, 14 pages.

* cited by examiner

*Primary Examiner* — Robert Deberadinis
(74) *Attorney, Agent, or Firm* — Ward and Smith, P.A.

(57) ABSTRACT

Embodiments of the present inventive concept provide an external battery module (EBM) including a communication server board (CSB) slot configured to receive a CSB, wherein the EBM operates regardless of whether the CSB is positioned in the CSB slot; and a battery charger slot configured to receive a battery charger, wherein the EBM operates regardless of whether the battery charger is positioned in the battery charger slot.

27 Claims, 4 Drawing Sheets

ADAPTABLE EXTERNAL BATTERY MODULES AND RELATED SYSTEMS

FIELD

The inventive concept relates generally to uninterruptible power supplies (UPSs) and, more particularly, to external battery modules for use with UPSs.

BACKGROUND

Uninterruptible power supply (UPS) systems are commonly used in installations such as data centers, medical centers and industrial facilities. UPS systems may be used in such installations to provide backup power to maintain operation of computer, medical devices and other critical equipment in event of failure of a primary utility supply. These UPS systems commonly have an "on-line" configuration including a rectifier and inverter coupled by a DC link that is also coupled to a backup power source, such as a battery. Other UPS configurations may also be used, such as standby and line-interactive configurations.

External battery modules (EBMs) may be used to extend the run-time (back-up time) of UPSs and do not typically have any in-built intelligence. In other words, EBMs are generally a chassis with a fixed number of battery packs without any monitoring circuitry. In an EBM having multiple battery packs in multiple slots of the EBM chassis (modular EBM), there currently is no cost-effective way to identify a state of a battery, for example, to identify if a particular battery pack has bad batteries that need to be replaced.

Smart EBMs may be provided by adding monitoring circuits to all the battery packs. However, this is an expensive way addressing this problem. Thus, improved methods of monitoring batteries in an EBM may be desired.

SUMMARY

Some embodiments of the inventive concept provide an external battery module (EBM) including a communication server board (CSB) slot configured to receive a CSB and a battery charger slot configured to receive a battery charger. The EBM operates regardless of whether the CSB is positioned in the CSB slot or the battery charger is positioned in the battery charger slot.

In further embodiments, when a CSB is positioned in the CSB slot, the EBM may be configured to communicate with a CSB of an uninterruptible power supply (UPS). The UPS may be configured to control and/or monitor the EBM. The UPS may be configured to communicate with the EBM via a controller area network (CAN) bus.

In still further embodiments, the EBM may be configured to communicate how many battery strings are present in the EBM; which slots in a chassis are empty; which slots in the chassis are in use; which slots in the chassis have bad batteries; when an EBM has been added; how many total EBMs are present.

In some embodiments, the UPS may be configured to turn a battery charger positioned in the battery charger slot in the EBM on and off remotely; calibrate the battery charger remotely; and generate an alarm condition to be communicated to the user.

In further embodiments, the UPS may be further configured to automatically detect a presence of a battery charger in the battery charger slot using slot selection circuitry and the CAN bus network.

In still further embodiments, the UPS may be further configured to detect an actual charger power delivered by a charger and use the detected actual charger power to estimate the battery time remaining (BTR).

In some embodiments, a battery charger positioned in the battery charger slot may be hot swappable.

In further embodiments, a CSB may be positioned in the CSB slot and a battery charger may not be positioned in the battery charger slot.

In still further embodiments, a CSB may not be positioned in the CSB slot and a battery charger may be positioned in the battery charger slot.

In some embodiments, a CSB may not be positioned in the CSB slot and a battery charger may not be positioned in the battery charger slot.

In further embodiments, the EBM includes at least two battery modules and each battery module may include five batteries.

Further embodiments of the present inventive concept provide a system for monitoring back up power. The system includes an uninterruptible power supply (UPS) positioned in a first chassis; and at least one external battery module (EBM) coupled to the UPS and positioned in a second chassis. The EBM includes a communication server board (CSB) slot configured to receive a CSB and a battery charger slot configured to receive a battery charger. The EBM operates regardless of whether the CSB is positioned in the CSB slot or the battery charger is positioned in the battery charger slot.

In still further embodiments, the at least one EBM comprises a plurality of EBMs daisy chained together.

In some embodiments, the first chassis and the second chassis may be the same chassis.

In further embodiments, the first chassis and the second chassis may be different chassis.

In still further embodiments, the UPS may include a UPS CSB. When a CSB is positioned in the CSB slot, the EBM may be configured to communicate with the UPS CSB. The UPS may be configured to monitor the EBM.

DETAILED DESCRIPTION

Figure 1:
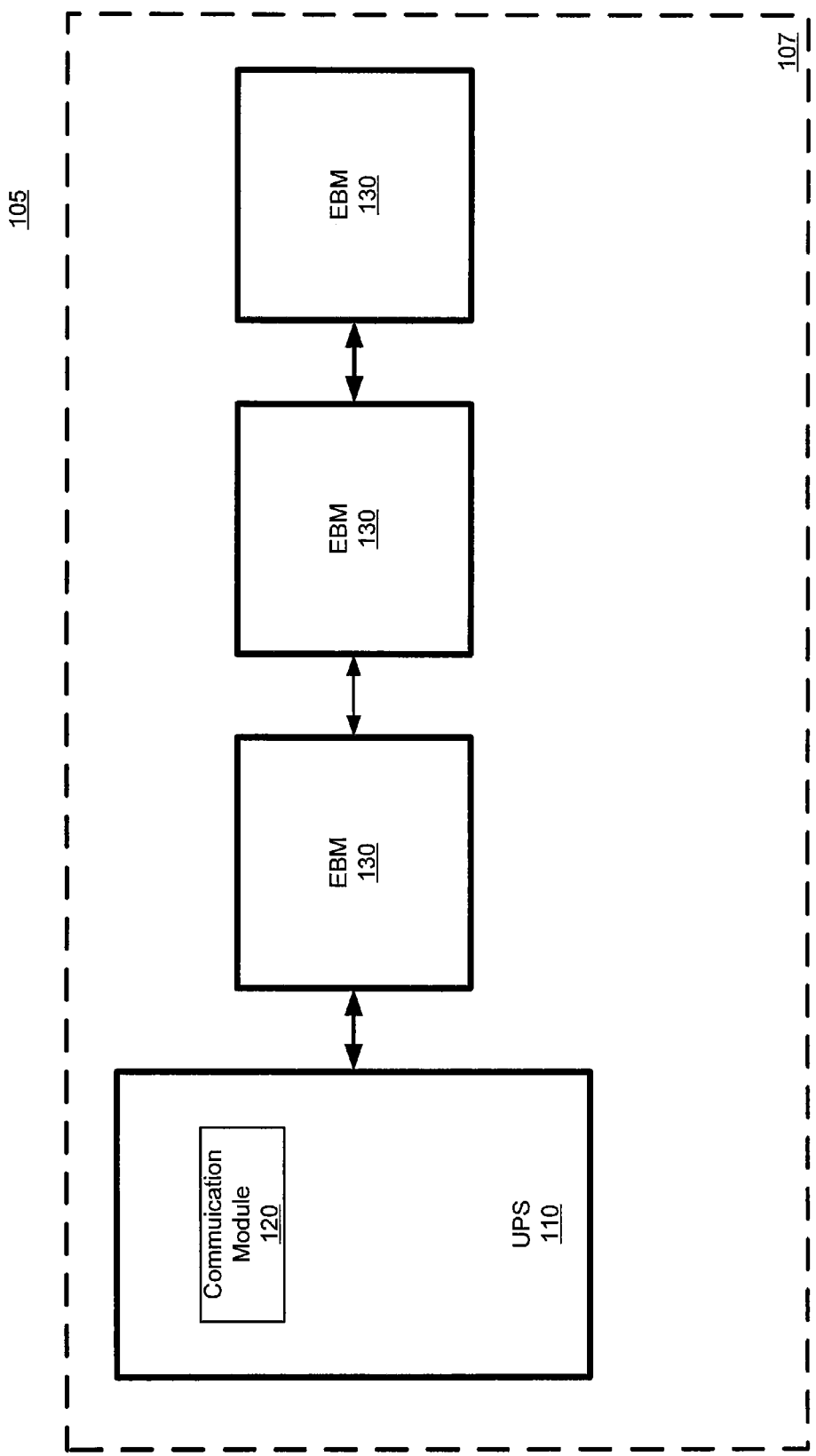
FIG. 1 is a block diagram of a system including an uninterruptible power supply (UPS) and a plurality of external battery modules (EBMs) in accordance with some embodiments of the present inventive concept.

Specific example embodiments of the inventive concept now will be described with reference to the accompanying drawings. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive concept. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As discussed above, there currently is no cost-effective way to identify a state of a battery in a modular external battery module (EBM), for example, to identify if a particular battery pack has bad batteries that need to be replaced. Smart EBMs may be provided by adding monitoring circuits to all the battery packs. However, this is an expensive way of addressing this problem. In particular, with smart EBMs, customers have to pay for an expensive EBM including the circuitry whether they want the intelligence in the EBM or not. Furthermore, if an external battery charger becomes necessary, there is no way for the uninterruptible power supply (UPS) to control or monitor the external charger. In addition to these problems, modular EBMs cannot automatically detect whether there is a battery pack and/or or battery charger installed in the chassis associated with the EBM. Thus, when multiple EBMs are used in a "daisy-chain" fashion, there is no easy/automatic way to detect how many EBMs and/or how many battery packs are connected to the UPS, there is no automatic way to update the Battery Remaining Time (BTR) associated with a battery and may require user intervention. Accordingly, some embodiments of the present inventive concept address these issues with conventional smart EBMs as will be discussed below with respect to FIGS. 1 through 4.

Referring now to FIG. 1, a basic block diagram of a system in accordance with embodiments of the present inventive concept will be discussed. As illustrated in FIG. 1, the system 105 includes a UPS 110 and a plurality of EBMs 130 daisy chained together. As used herein, "daisy-chain" refers to connecting two or more devices together in a linear series. As further illustrated by the dotted line, the UPS 110 and the EBMs 130 may all be included in a single chassis 107. However, in some embodiments the UPS 110 and the EBMs 130 may be positioned in separate chassis without departing from the scope of the present inventive concept. It will be understood that the configuration of FIG. 1 is provided for example purposes only and that embodiments of the present inventive concept are not limited the configuration thereof. For example, although three EBMs 130 are illustrated in FIG. 1, embodiments of the present inventive concept could include more or less than three EBMs without departing from the scope of the present inventive concept.

To extend run-time (back-up time), UPSs 110 use EBMs 130. Conventional EBMs were typically "dumb," i.e. a chassis with a set number of battery strings (battery packs) without any intelligence. However, embodiments of the present inventive concept provide smart, adaptable EBMs 130.

Figure 2:
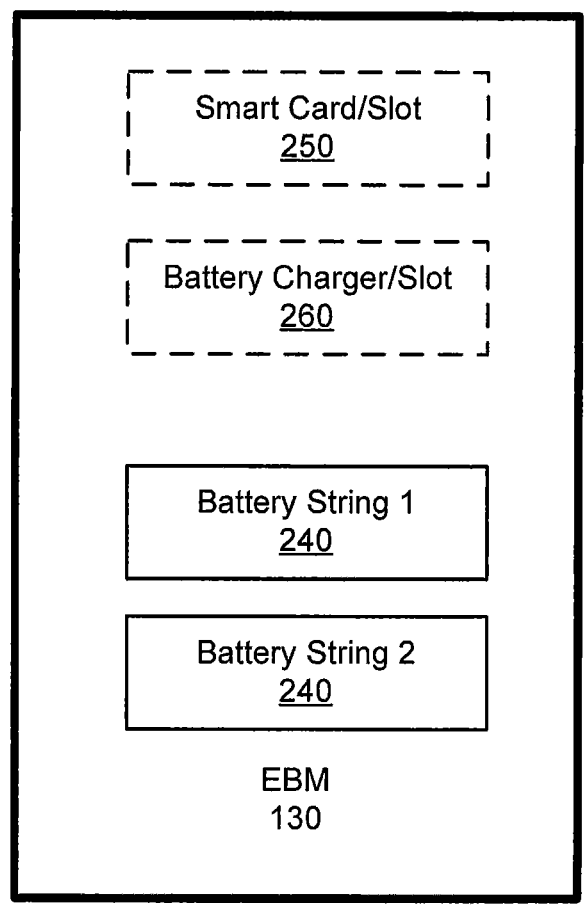
FIG. 2 is a more detailed block diagram of an EBM in accordance with some embodiments of the present inventive concept.

Referring now to FIG. 2, EBMs 130 in accordance with some embodiments of the present inventive concept will be discussed. As illustrated in FIG. 2, the EBM 130 may include a plurality of battery strings, for example, battery strings 1 and 2 (240). In some embodiments, each of the battery strings 1 and 2 (240) may include two modules, each module including 5 batteries, thus, each EBM in FIG. 2 would have 20 batteries total. However, embodiments of the present inventive concept are not limited to this configuration. For example, some embodiments may include 12 battery strings including 24 total modules and a total of 120 batteries. As further illustrated in FIG. 2, EBMs in accordance with embodiments of the present inventive concept may include an optional smart card 250 and/or an optional battery charger 260. The optional nature of the smart card 250 and/or battery charger 260 is indicated in FIG. 2 by the dotted lines. Thus, in some embodiments of the present inventive concept, the EBM may be "dumb", i.e. no smart card 250, but may be made "smart" by adding a smart card 250, for example, a Communication Server Board (CSB) as will be discussed further below with respect to FIG. 3. Embodiments of the present inventive concept may also include an optional battery charger 260. Thus, embodiments may be "dumb" having neither the smart card 250 nor the battery charger 260; smart with the smart card 250; or smart with the smart card 250 and a battery charger 260 without departing from the scope of the present inventive concept.

Figure 3:
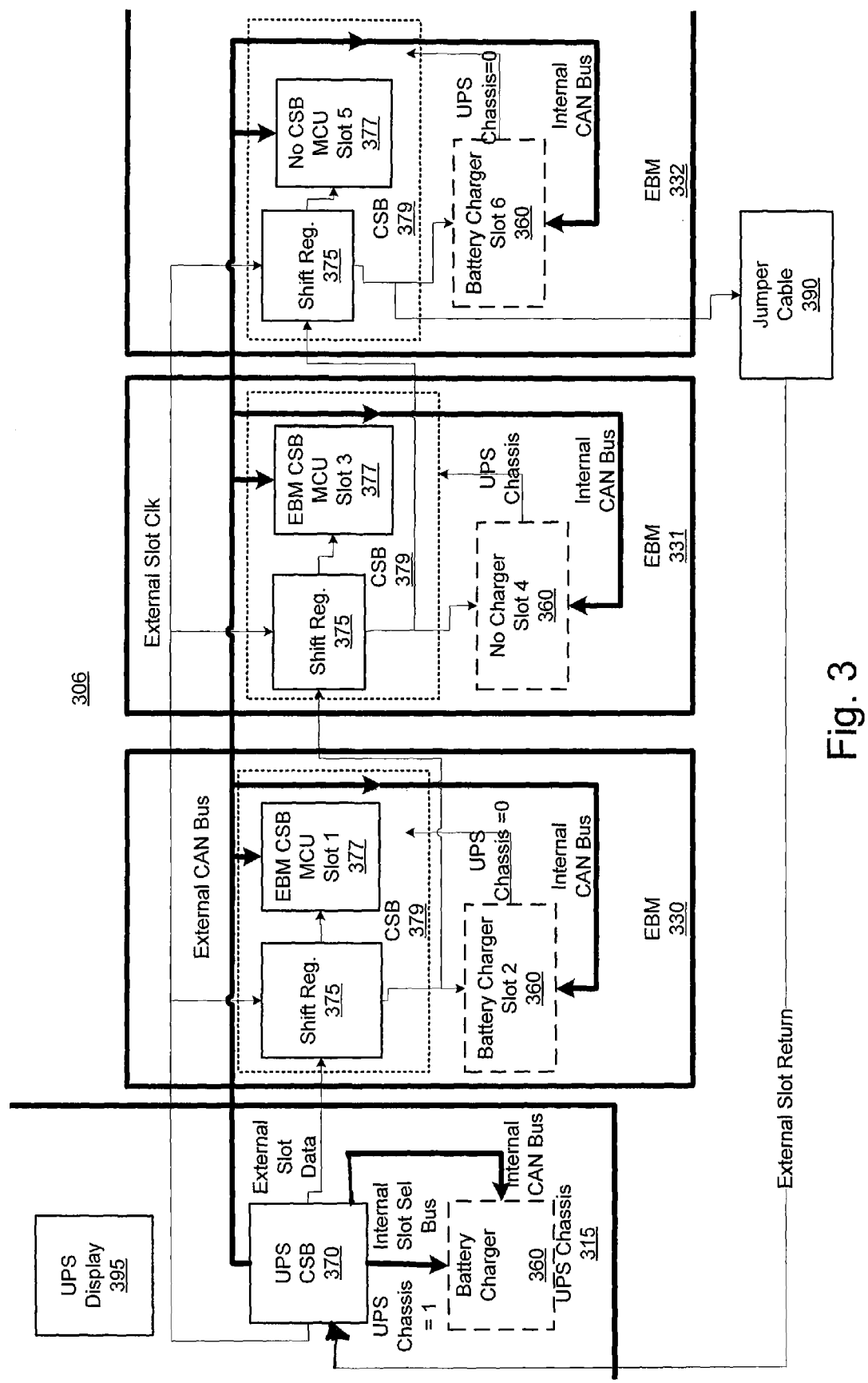
FIG. 3 is a more detailed block diagram of the system of FIG. 1 including a UPS and a plurality of EBMs in accordance with some embodiments of the present inventive concept.

Referring now to FIG. 3, a more detailed block diagram of the system 306 will be discussed. As illustrated in FIG. 3, the system 306 includes a UPS (chassis) 315 including a UPS and a plurality of EBMs 330, 331 and 332. The UPS 315 includes a UPS CSB 370 and a battery charger 360. It will be understood that the battery charger is an optional component in the UPS 315 as indicated by the dotted lines. As further illustrated in FIG. 3, each of the EBMs 330, 331 and 332 are provided with a "slot" for a battery charger 360 and a "slot" for a smart card, for example, a CSB 379. Each CSB 379 includes an shift register 375 and a microcontroller (MCU) 377. It will be understood that although embodiments of the present inventive concept discuss "slots" for receiving the cards, embodiments of the present inventive concept are not limited to this configuration. For example, in some embodiments, the cards may be received in trays without departing from the scope of the present inventive concept.

As illustrated in FIG. 3, external slot data is communicate between the UPS 315 and the shift registers 375 of the CSBs 379. This slot data is provided to the jumper cable 390 and returned back to the UPS CSB 370. This data may be used to determine information with respect to the slots and whether or not the slots are in use as will be discussed further below. For example, the external slot clock signal may be used to detect CSBs and chargers.

As discussed above, although the EBMs include slots for the CSB and battery charger, these slots may be empty, i.e. the CSB and/or battery charger need not be installed in the slot for the EBM to function. For example, EBM 330 includes both an MCU 377 in the slot provided (slot 1) and a battery charger 360 in the slot provided (slot 2). Thus, EBM 330 is both smart and has battery charging capabilities. EBM 331 includes an MCU 377 in the slot provided (slot 3), but does not include a battery charger 360 in the slot provided (slot 4). Thus, EBM 331 is smart, but does not have battery charging capabilities. Finally, EBM 332 does not include an MCU 377 in the slot provided (slot 5), but includes a battery charger 360 in the slot provided (slot 6). Thus, EBM 332 is "dumb", but has battery charging capabilities. In further embodiments, neither slot may be utilized, therefore, providing a dumb EBM with no battery charging capabilities.

The EBM CSB MCU 377 can be attached to the EBM mechanically in the slot. When electrically connected to the UPS 315, the EBM with the CSB can communicate with the UPS. The EBM CSB can communicate, for example, how many battery strings the EBM has; which slots in the chassis are empty/in use; which slots in the chassis have bad batteries using a center point voltage as will be discussed further below; the addition of an EBM (automatically) without any user intervention; how many EBMs are connected.

In some embodiments, the optional battery charger 360 is a hot-swappable module that can be installed by the customer into one of the EBM chassis slots as discussed above. As used herein, "hot-swappable" refers to the ability to position in or remove the battery charger from the slot without removing power from the system. Thus, in some embodiments of the present inventive concept, the presence of a battery charger in one of the slots of the EBM can be automatically detected and the actual charger power (watts) being delivered by the charger can be detected in order to better estimate the BTR.

As illustrated in FIG. 3, the battery charger 360 may be provided in the UPS chassis 315 or may be provided in a separate chassis (not shown). Thus, using the UPS CSB 370, the UPS can control the remotely located battery charger(s) 360 installed in the slots in the EBM. For example, the UPS can turn the battery charger 360 in an EBM on and off remotely and calibrate the battery charger 360 remotely. Furthermore, in some embodiments, the UPS can detect a failed battery charger and generate an alarm condition that can be communicated to the user and displayed on a display 395, for example, an LCD on a front Panel of the UPS.

In some embodiments, UPS CSB 370 may sense the presence of a battery charger in the slot. Furthermore, UPS CSB 370 may be configured to calculate BTR based on a number of battery strings attached in the entire system, internal to UPS chassis and all EBMs. AC input failure to the EBM mounted charger may not be communicated to the UPS. In these embodiments, a different alarm may be communicated in the UPS, which may indicate insufficient charger capability.

Referring again to FIG. 3, as illustrated, the communication between the UPS 315 and the Smart EBM is via an external/internal controller area network (CAN) bus. The external and internal CAN buses are connected via a jumper. The optional battery Charger(s) 360 in the EBM is also controlled via the CAN Bus. The CSB 379 in the EBM 330, 331 and 332 transmits a clock signal to each of the slots in the EBM, for example, via the back panel of the EBM. This signal ripples through each slot, and, in conjunction with the Battery Center Voltage Detect and Battery Charger ID signals, helps identify whether each slot in the EBM is empty or in use, for example, has a battery pack or is empty. It may also be determined that the battery pack is bad and needs to be replaced.

As illustrated in FIG. 3, an internal slot select bus duplicated in each EBM chassis allows a CSB to detect battery strings and bad batteries. The optional battery chargers 360 are controlled and monitored by the UPS via the CAN bus. As discussed above and illustrated in FIG. 3, the EBM 332 does not have to be smart (that is, no CSB 377 in the slot) for it to have an optional battery charger 360 controlled by the UPS 315. Thus, embodiments of the present inventive concept provide an adaptable EBM. By simply removing the EBM's CSB module 377 from the slot, it will be similar to a dumb EBM if the customer so chooses and, thus, cost less money than the version with the CSB. Typically, a customer may want to have the first two or three EBMs in a daisy chain be smart and may choose to keep additional EBMs dumb to control costs. Thus, embodiments of the present inventive concept allow the customer to choose how to design the system to be in line with their budget. Furthermore, distributors also do not have to stock separate types of EBMs in their warehouses.

Figure 4:
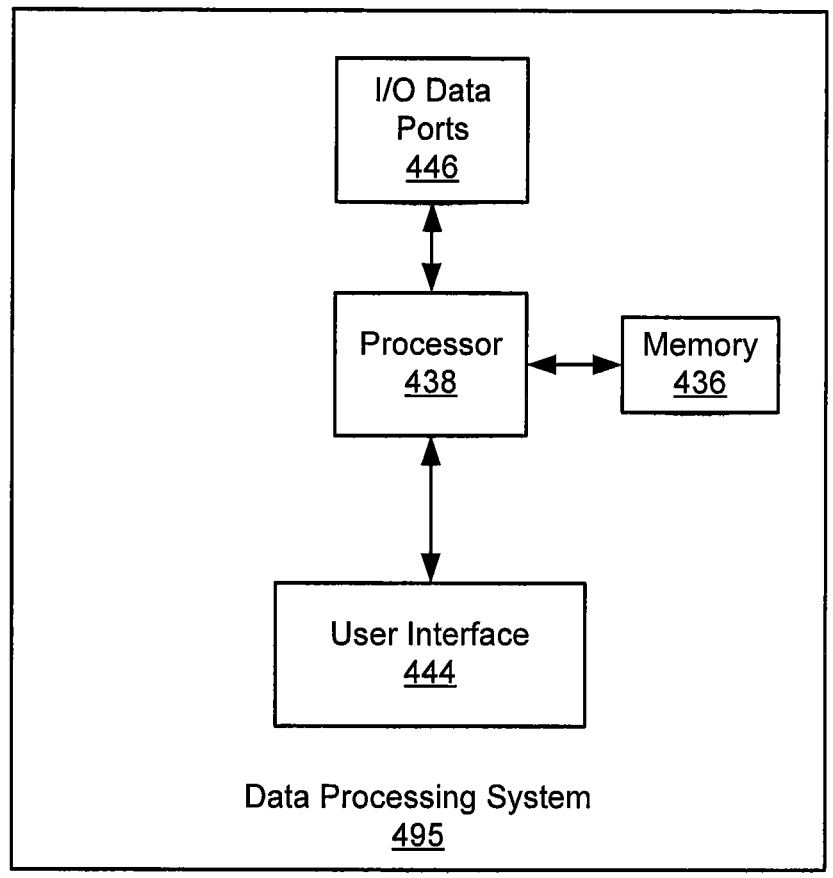
FIG. 4 is a block diagram illustrating a data processor that can be used in accordance with various embodiments of the present inventive concept.

Referring now to FIG. 4, a block diagram of a data processing system 495 that may be included in one of more of the communications module 120 and/or the UPS in accordance with some embodiments will be discussed. As illustrated in FIG. 4, the data processing system 495 may include a user interface 444, including, for example, input device(s) such as a man machine interface (MMI) including, but not limited to a keyboard or keypad and a touch screen; a display; a speaker and/or microphone; and a memory 436 that communicate with a processor 438. The data processing system 495 may further include I/O data port(s) 446 that also communicates with the processor 438. The I/O data ports 446 can be used to transfer information between the data processing system 495 and another computer system or a network, such as an Internet server, using, for example, an Internet Protocol (IP) connection. These components may be conventional components such as those used in many conventional data processing systems, which may be configured to operate as described herein.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed example embodiments of the inventive concept. Although specific terms are employed, they are used in a generic and descriptive sense only and not for purposes of limitation, the scope of the inventive concept being defined by the following claims.

That which is claimed:

1. An external battery module (EBM) comprising:
    a communication server board (CSB) slot configured to receive only a CSB, wherein the EBM operates regardless of whether the CSB is positioned in the CSB slot; and
    a battery charger slot configured to receive only a battery charger, wherein the EBM operates regardless of whether the battery charger is positioned in the battery charger slot.

2. The EBM of claim 1:
    wherein when a CSB is positioned in the CSB slot, the EBM is configured to communicate with a CSB of an uninterruptible power supply (UPS); and
    wherein the UPS is configured to control and/or monitor the EBM.

3. The EBM of claim 2, wherein the UPS is configured to communicate with the EBM via a controller area network (CAN) bus.

4. The EBM of claim 1, wherein the EBM is configured to communicate how many battery strings are present in the EBM; which slots in a chassis are empty; which slots in the chassis are in use; which slots in the chassis have bad batteries; when an EBM has been added; how many total EBMs are present and whether a battery charger is installed.

5. The EBM of claim 2, wherein the UPS is configured to turn a battery charger positioned in the battery charger slot in the EBM on and off remotely; calibrate the battery charger remotely; detect a failed battery charger; and generate an alarm condition that is communicated to a user.

6. The EBM of claim 5, wherein the UPS is further configured to automatically detect a presence of a battery charger in the battery charger slot using slot selection and CAN bus communications.

7. The EBM of claim 6, wherein the UPS is further configured to detect an actual charger power delivered by a charger and use the detected actual charger power to estimate battery time remaining (BTR).

8. The EBM of claim 1, wherein a battery charger positioned in the battery charger slot is hot swappable.

9. The EBM of claim 1, wherein a CSB is positioned in the CSB slot and wherein a battery charger is not positioned in the battery charger slot.

10. The EBM of claim 1, wherein a CSB is not positioned in the CSB slot and wherein a battery charger is positioned in the battery charger slot.

11. The EBM of claim 1, wherein a CSB is not positioned in the CSB slot and wherein a battery charger is not positioned in the battery charger slot.

12. The EBM of claim 1, wherein the EBM comprises at least two battery modules and wherein each battery module comprises five batteries.

13. A system for monitoring back up power, the system comprising:
    an uninterruptible power supply (UPS) positioned in a first chassis; and
    at least one external battery module (EBM) coupled to the UPS and positioned in a second chassis, the EBM comprising:

a communication server board (CSB) slot configured to receive only a CSB, wherein the EBM operates regardless of whether the CSB is positioned in the CSB slot; and a battery charger slot configured to receive only a battery charger, wherein the EBM operates regardless of whether the battery charger is positioned in the battery charger slot.

14. The system of claim 13, wherein the at least one EBM comprises a plurality of EBMs daisy chained together.

15. The system of claim 13, wherein the first chassis and the second chassis are the same chassis.

16. The system of claim 13, wherein the first chassis and the second chassis are different chassis.

17. The system of claim 13:
wherein the UPS comprises a UPS CSB;
wherein when a CSB is positioned in the CSB slot, the EBM is configured to communicate with the UPS CSB; and
wherein the UPS is configured to control and/or monitor the EBM.

18. The system of claim 17, wherein the UPS is configured to communicate with the EBM via a controller area network (CAN) bus.

19. The system of claim 13, wherein the EBM is configured to communicate how many battery strings are present in the EBM; which slots in a chassis are empty; which slots in the chassis are in use; which slots in the chassis have bad batteries; when an EBM has been added; how many total EBMs are present; whether a battery charger is installed and battery time remaining.

20. The system of claim 13, wherein the UPS is configured to turn a battery charger positioned in the battery charger slot in the EBM on and off remotely; calibrate the battery charger remotely; detect a failed battery charger and generate an alarm condition that is communicated to a user.

21. The system of claim 20, wherein the UPS is further configured to automatically detect a presence of a battery charger in the battery charger slot using slot selection circuitry and CAN bus communications.

22. The system of claim 21, wherein the UPS is further configured to detect an actual charger power delivered by a charger and use the detected actual charger power to estimate battery time remaining (BTR).

23. The system of claim 13, wherein a battery charger positioned in the battery charger slot is hot swappable.

24. The system of claim 13, wherein a CSB is positioned in the CSB slot and wherein a battery charger is not positioned in the battery charger slot.

25. The system of claim 13, wherein a CSB is not positioned in the CSB slot and wherein a battery charger is positioned in the battery charger slot.

26. The system of claim 13, wherein a CSB is not positioned in the CSB slot and wherein a battery charger is not positioned in the battery charger slot.

27. The system of claim 13, wherein the EBM comprises at least two battery modules and wherein each battery module comprises five batteries.

* * * * *